US010531139B2

(12) United States Patent
Kim

(10) Patent No.: US 10,531,139 B2
(45) Date of Patent: Jan. 7, 2020

(54) SYSTEM AND METHOD FOR RECOMMENDING MEDIA

(71) Applicant: Byung-In Kim, Incheon (KR)

(72) Inventor: Byung-In Kim, Incheon (KR)

( * ) Notice: Subject to any disclaimer, the term of this patent is extended or adjusted under 35 U.S.C. 154(b) by 0 days.

(21) Appl. No.: 15/874,872

(22) Filed: Jan. 18, 2018

(65) Prior Publication Data

US 2019/0028749 A1 Jan. 24, 2019

Related U.S. Application Data

(60) Provisional application No. 62/423,877, filed on Nov. 18, 2016.

(51) Int. Cl.

| | |
|---|---|
| ***H04N 21/25*** | (2011.01) |
| ***G06N 7/00*** | (2006.01) |
| ***H04N 21/475*** | (2011.01) |
| ***H04N 21/2668*** | (2011.01) |
| ***H04N 21/4788*** | (2011.01) |
| ***H04N 21/258*** | (2011.01) |
| ***H04N 21/466*** | (2011.01) |

(52) U.S. Cl.

CPC .......... *H04N 21/252* (2013.01); *G06N 7/005* (2013.01); *H04N 21/25891* (2013.01); *H04N 21/2668* (2013.01); *H04N 21/4668* (2013.01); *H04N 21/4756* (2013.01); *H04N 21/4788* (2013.01)

(58) Field of Classification Search

CPC .... H04N 21/25; H04N 21/251; H04N 21/252; H04N 21/45; H04N 21/466; H04N 1/25891; H04N 21/2668; H04N 21/4756; H04N 21/4788; G06N 7/005

See application file for complete search history.

(56) References Cited

U.S. PATENT DOCUMENTS

2005/0144499 A1 * 6/2005 Narahara .............. H04H 60/31 714/1
2014/0258027 A1 * 9/2014 Veugen ............. G06Q 30/0278 705/26.7
2016/0142783 A1 * 5/2016 Bagga ............. H04N 21/47214 725/47

* cited by examiner

*Primary Examiner* — Omar S Parra
(74) *Attorney, Agent, or Firm* — Timothy T. Hsieh

(57) ABSTRACT

The present disclosure is directed to systems and methods for recommending media. A system for recommending media includes a user data server to store media watched data and rating data for a plurality of users; a grouping processor coupled to the user data server that aggregates users into groups based on criteria applied to the media watched data and the rating data stored in the user data server; and a collective score processor coupled to the grouping processor that calculates a collective score for the groups with a collective scoring system.

7 Claims, 8 Drawing Sheets

<Upper Layer>

| Movie/ID | # of Audience | gusi*** (31) | haku*** (9) | ligh*** (14) | cloc*** (17) | jsm9*** (20) | whit*** (17) |
|---|---|---|---|---|---|---|---|
| Insiders | 17 | 1 | | | 1 | | 1 |
| Martian | 15 | 1 | 1 | | 1 | | 1 |
| Mad Max | 14 | 1 | 1 | 1 | 1 | | 1 |
| Maze Runner | 5 | 1 | | | | | 1 |
| Veteran | 15 | 1 | | 1 | 1 | 1 | |
| Throne | 12 | 1 | | | | | |
| Journey To The West | 1 | 1 | | | | | |
| Star Wars: The Force Awakens | 8 | 1 | | | | | |
| Antman | 5 | 1 | | | | 1 | |
| Imitation Game | 3 | 1 | | | | | 1 |
| King's Man | 9 | 1 | 1 | 1 | 1 | | 1 |
| Hunger Game | 4 | 1 | | | | | |
| Himalayas | 16 | 1 | 1 | 1 | | 1 | 1 |
| # of Movies Watched/Person | | 13 | 18 | 22 | 42 | 17 | 26 |
| **# of Movies Overlapped** | | | 4 | 4 | 5 | 3 | 7 |
| | | | 31% | 31% | 38% | 23% | 54% |
| **# of Ratings Overlapped** | | | 2 | 2 | 3 | 1 | 3 |
| | | | 50% | 50% | 60% | 33% | 43% |
| **Sync Index** | | | 15 | 15 | 23 | 8 | 23 |

<Center Layer>

| Movie/ID | # of Audience | gusi*** (31) | whyn*** (1) | mozz*** (3) | y_yh*** (4) | desi*** (11) | rlac*** (25) | wino*** (27) | 20fh*** (38) | yuha*** (39) | dark*** (40) | inso*** (42) |
|---|---|---|---|---|---|---|---|---|---|---|---|---|
| Insiders | 17 | 1 | 1 | | | | 1 | | 1 | | 1 | |
| Martian | 15 | 1 | | | 1 | 1 | 1 | | 1 | 1 | | |
| Mad Max | 14 | 1 | 1 | | | | | 1 | | | | |
| Maze Runner | 5 | 1 | | | | | 1 | | | | 1 | |
| Veteran | 15 | 1 | | | 1 | | | | 1 | | 1 | |
| Throne | 12 | 1 | | | 1 | | | | 1 | | | |
| Journey To The West | 1 | 1 | | | | | | | | | | |
| Star Wars: The Force Awakens | 8 | 1 | | | | | | | | 1 | 1 | |
| Antman | 5 | 1 | | | | | | | 1 | | 1 | |
| Imitation Game | 3 | 1 | | | | | | | | | | |
| King's Man | 9 | 1 | | 1 | | | | | | | | 1 |
| Hunger Game | 4 | 1 | | | | | 1 | | | 1 | | |
| Himalayas | 16 | 1 | | | 1 | | 1 | 1 | | 1 | 1 | |
| # of Movies Watched/Person | | | 12 | 11 | 12 | 15 | 10 | 11 | 14 | 11 | 14 | 10 |
| **# of Movies Overlapped** | | | 2 | 1 | 4 | 1 | 5 | 2 | 5 | 4 | 6 | 1 |
| | | | 15% | 8% | 31% | 8% | 38% | 15% | 38% | 31% | 46% | 8% |
| **# of Ratings Overlapped** | | | 1 | 1 | 2 | 1 | 3 | 0 | 2 | 2 | 3 | 1 |
| | | | 50% | 100% | 50% | 100% | 60% | 0% | 40% | 50% | 50% | 100% |
| **Sync Index** | | | 8 | 8 | 15 | 8 | 23 | 0 | 15 | 15 | 23 | 8 |

200

Stage 5

Diagram

SYSTEM AND METHOD FOR RECOMMENDING MEDIA

CROSS REFERENCE TO RELATED APPLICATIONS

This application claims the benefit of U.S. Provisional Application Ser. No. 62/423,877, entitled "SYSTEM AND METHOD FOR RECOMMENDING MEDIA" and filed on Nov. 18, 2016, the entirety of which is herein incorporated by reference.

TECHNICAL FIELD

The present disclosure generally relates to tangible systems and methods tied to tangible systems used for providing interactive dynamic data to users or consumers, particularly to systems and methods for recommending media to users.

BACKGROUND

Currently, websites on computers, mobile applications on smartphones, software systems on various hardware or hardware systems (e.g., interactive kiosks) provide ratings of movies, television series, novels, short stories, comics, web series or new media content (hereinafter "media") on a single averaged-out number or score per media from all the ratings given by each viewer of such media. Such number or score is supposed to give guidance to the audience members to decide if it is worthwhile to invest their time and money to watch certain media. However, one issue is that such averaged-out numbers (per media) do not guarantee satisfaction, especially when the score for a media on these previously existing platforms is a high averaged-out number. This may be due to how the taste of audiences vary too widely to be represented by single averaged-out number. Therefore, an improved system to more accurately score media is not shown in the prior art.

SUMMARY

Provided is a system and method for recommending media. A system for recommending media includes a user data server to store media watched data and rating data for a plurality of users; a grouping processor coupled to the user data server that aggregates users into groups based on criteria applied to the media watched data and the rating data stored in the user data server; and a collective score processor coupled to the grouping processor that calculates a collective score for the groups with a collective scoring system.

A method for recommending media, includes: receiving a media watched and a rating for it from a user; for a plurality of users, calculating a media-in-common factor and a ratings-in-common factor based on the rating and media watched and the rating; grouping users into user clusters based on the media-in-common factor and the ratings-in-common factor; and for each user cluster, calculating a collective score a new media based on a collective scoring system.

A method for recommending media, comprising: receiving a media watched and a rating for it from a user; for a plurality of users, aggregating a group of users who watched at least one of the same media; splitting the group of users into multiple layers based on the amount of media a user has watched; and for each layer, matching users with similar taste based on a media-in-common factor and a ratings-in-common factor.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Figure 1:
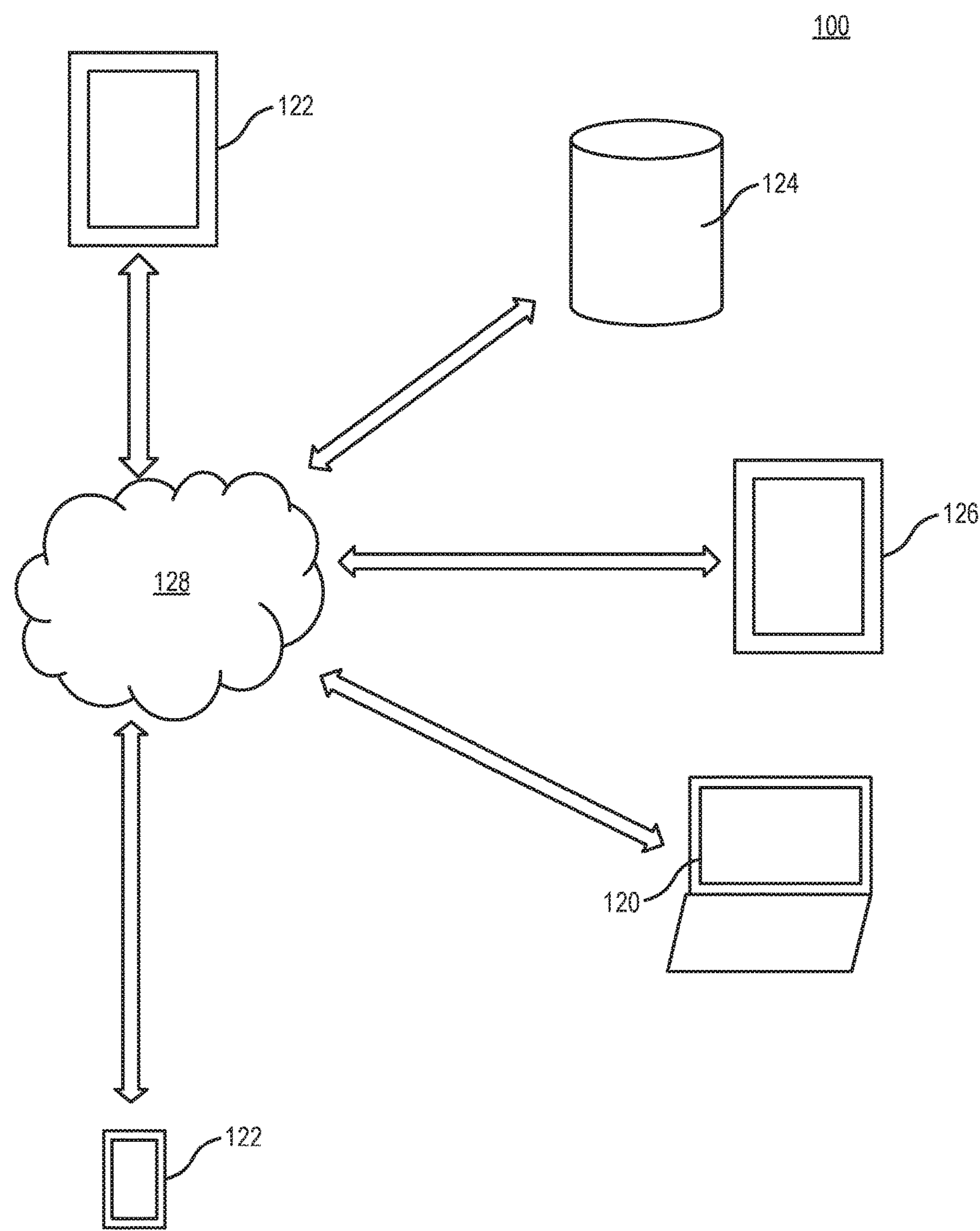
FIG. 1 shows a diagram of various components used for a system for recommending media, according to an aspect of the present disclosure.

FIG. 1 shows a diagram 120 of various components used for a system for recommending media, according to an aspect of the present disclosure. Diagram 120 includes a first host app 122, a host application program interface (API) 124, a second host app 126, an internet connection 128, a first user device 120, and a second user device 122. The first host app 122 can be a tablet device, computer, smartphone, computing device or similar device installed with the application using the system for recommending media used by a social network, software application developer, website publisher/owner, attribution provider, app store or website publisher. For example, the first host app 122 may be used by user logged on to a website or social network to allow users to rate media, find users with similar tastes in media and interact with other users about commonly enjoyed media or other topics. The second host app 126 can also be a tablet device or, smartphone mobile computing device or similar device installed with the application using the system for recommending media. For example, the second host app 126 may be used by an administrator of a social network or owner of a website or social network that allows users to rate media, find users with similar tastes in media and interact with other users about commonly enjoyed media or other topics. The first user device 120 can be a tablet, smartphone, mobile computing device or similar device installed with the application used to click on a link to download an app by the user. For example, the first user device 120 can be a smartphone connected to the internet 108 and used by a user. The second user device 122 can also be a smartphone, tablet, or similar device used by the user to click on a link or use an app to access a website or social network that allows users to rate media, find users of similar tastes, etc. For example the second user device 122 can be a smartphone connected to the internet 128 and used by a user. The host API 124 can store code, data or other information used to interface the first host app 122 and the second host app 126 with the first user device 130 and the second user device 132. The first host app 122, the second host app 124, the first user device 130 and the second user device 132 are all coupled, connected to or linked to the internet connection 128, either wirelessly or via a physical wired connection.

Figure 2A:
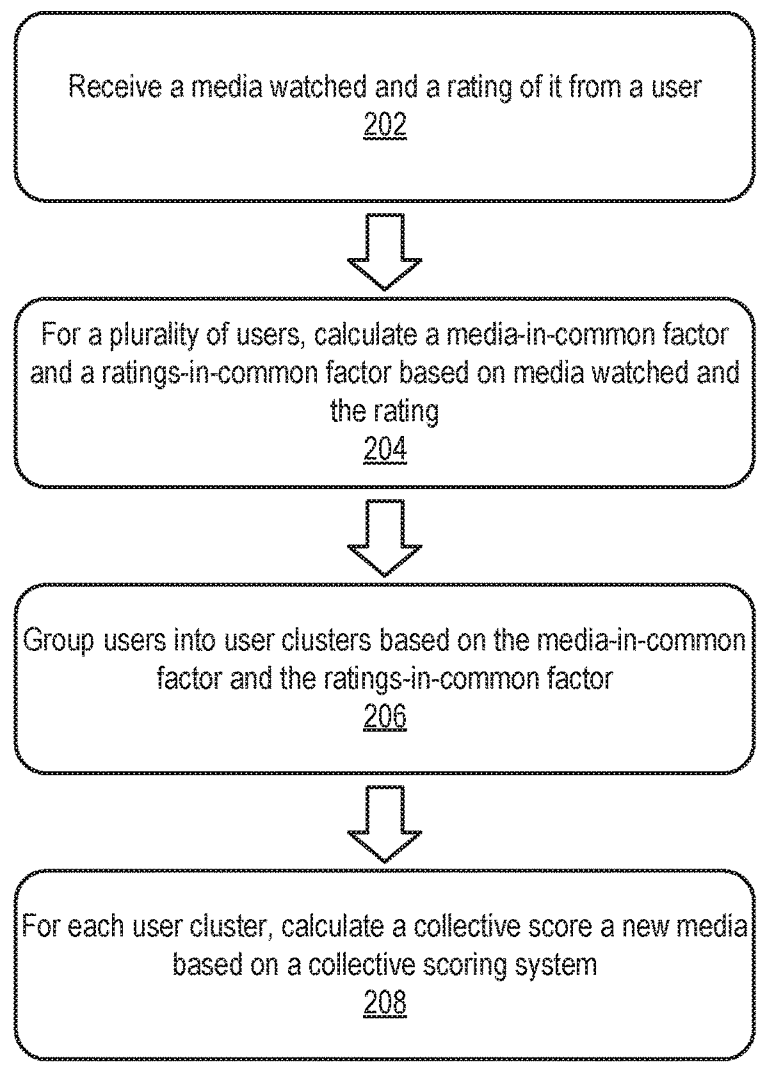
FIG. 2A shows a process flowchart of a method for recommending media, according to an aspect of the present disclosure.

FIG. 2A shows a process flowchart of a method for recommending media 200 including the following steps, which may or may not be performed sequentially. In step 202, the present system for recommending media receives a media watched and a rating of it from a user. In step 204, for a plurality of users, the present system calculates a media-in-common factor and a ratings-in-common factor based on media watched and the rating. In step 206, the present system groups users into user clusters based on the media-in-common factor and the ratings-in-common factor. In step 208, for each user cluster, the present system calculates a collective score a new media based on a collective scoring system.

Figure 2B:
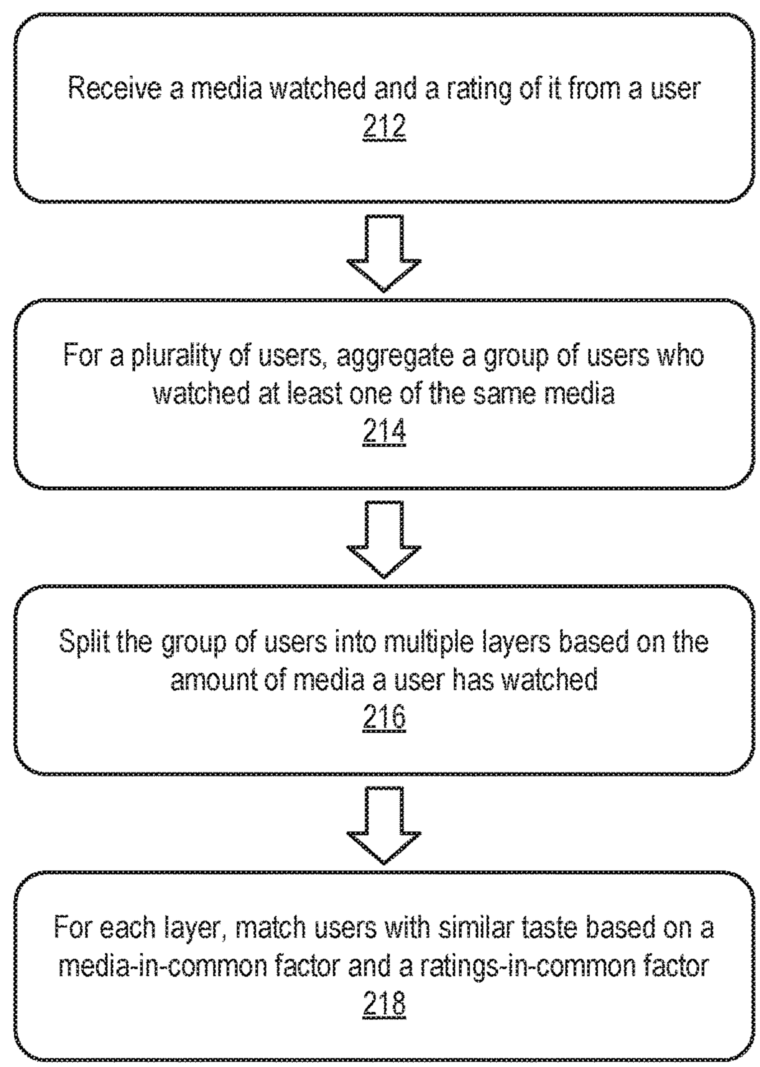
FIG. 2B shows another process flowchart of a method for recommending media, according to an aspect of the present disclosure.

FIG. 2B shows another process flowchart of a method for recommending media 210 including the following steps, which may or may not be performed sequentially. In step 212, the present system for recommending media receives a media watched and a rating of it from a user. In step 214, for a plurality of users, the present system aggregates a group of users who watched at least one of the same media. In step 216, the present system splits the group of users into multiple layers based on the amount of media a user has watched. In step 218, for each layer, the present system matches users with similar taste based on a media-in-common factor and a ratings-in-common factor.

Figure 3:
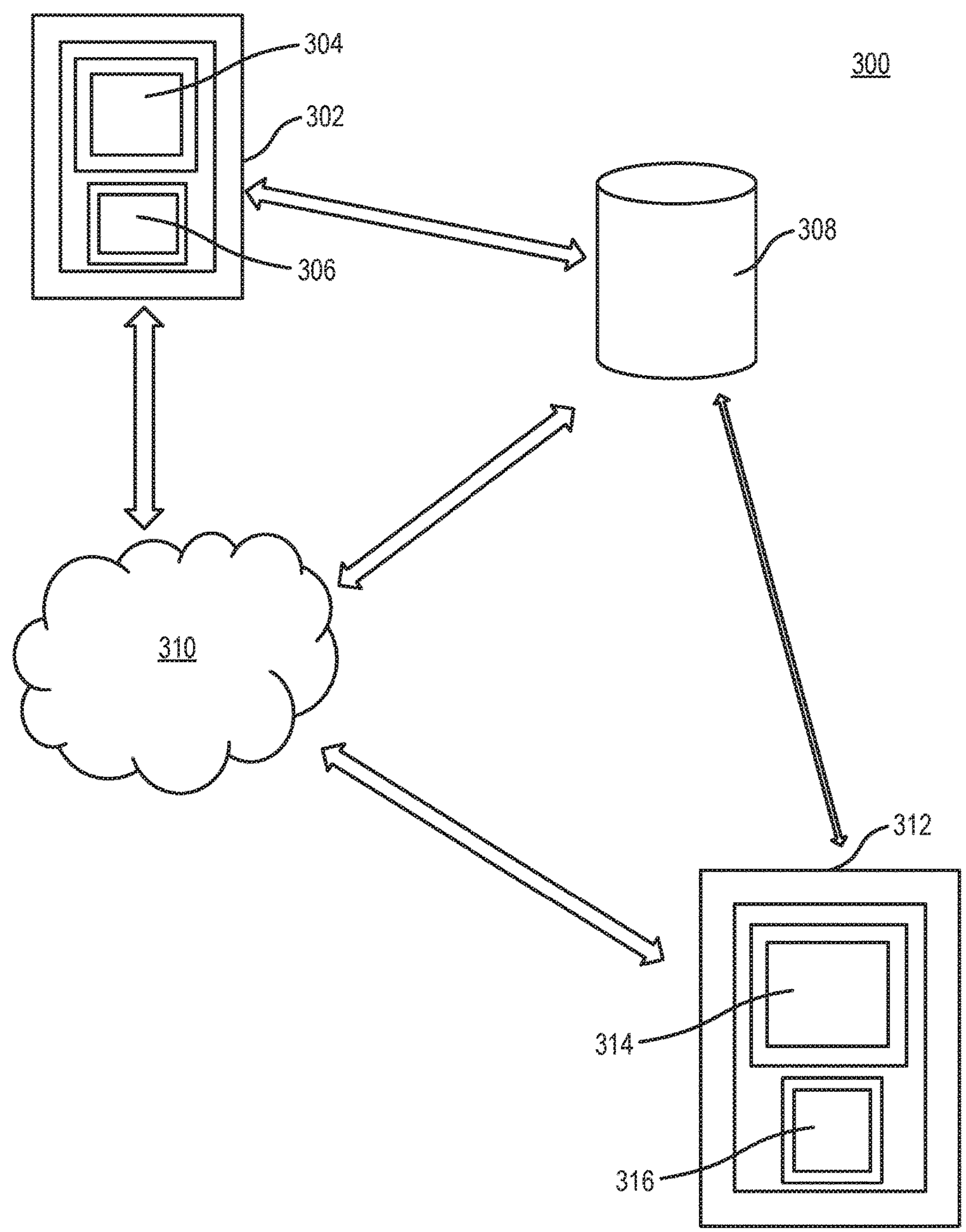
FIG. 3 shows a diagram of a system used for recommending media, according to an aspect of the present disclosure.

FIG. 3 shows a diagram 300 of a system for recommending media, according to an aspect of the present disclosure. Diagram 300 includes vendor device 302, which in turn includes a vendor display apparatus 304 and a vendor transmission apparatus 306; and a user device 312, which in turn includes a user display apparatus 314 and a user transmission apparatus 316. The vendor device 302, the reservation data server 308 and the user device 312 are all coupled to the internet 310. A vendor such as a social network, software application developer, attribution provider, website publisher/owner, third party app store or other party can use the vendor device 302, and a user can use the user device 312. The vendor reception apparatus 306 is configured to transmit and/or receive information such as rating data on media, which media was watched, user data and other information from a user or information from an owner of a website or social network, who again may be using the vendor device 302. The user display apparatus 314 is configured to display on the user device 312 information including the link the user clicks on to download the software application to rate and recommend media. The user transmission apparatus 316 is configured to receive visitor information (e.g. media ratings, media watched) for the vendor, who may again be using the vendor device 302. The media and rating server 308 is coupled to both the vendor device 302 and the user device 312. The media and rating data in the media and rating server 308 is also configured to determine visitor information (e.g. media watched, media ratings) from the vendor device 302, wherein the media and rating data server 308 is also configured to track visitor information and other data. The media and rating server 308 may also include (not shown) a module to calculate collective scores based on a scoring system, a module to calculate a media-in-common factor and/or a ratings-in-common factor, and other calculation mechanisms, hardware or processors.

Distinctions from Previous Systems

According to instances of the prior art, all consumable media content including and not limited to movies/films—both feature length films and short films, television series or shows, web series or shows and other digital or new media content, novels, short stories, comics, cartoons, or other similar content that can be viewed online or in print, or web series or new media content, all aforementioned forms being viewable in live-action, animation, or both (hereinafter "media") are rated by current platforms that provide only a number that is a single, averaged out value based on an individual number or rating provided by a single user or consumer of that particular media. For example, this number could go from 1 to 10, or be a letter grade from A to F; in any regard, there is a scale or quantifiable indicia to represent how much a particular user/consumer/audience member enjoyed a certain media or how good they thought the media to be.

Many currently existing platforms average out these individual number ratings into a single, averaged-out number that reflects how good the media was to an aggregated number of audience members and how much audience members collectively enjoyed a particular media. Examples of current platforms that provide a single averaged-out score include 'Rottentomatoes.com', 'IMDb.com', and 'Metacritic.com'. The scale of the ratings and formula of averaging the ratings would vary by sites (e.g., the numerical scale or letter grade scale mentioned previously, sites like Metacritic even analyze critical reviews and provide a letter grade based on a review even though the review did not provide any such letter grade), but they all generate a single averaged-out number per media. Supposedly, this single, averaged-out number will provide guidance to audience members in deciding which media to watch, serving the same purpose as movie or TV show critics, for example.

However, one problem is that such a single averaged-out value per media, or the methodology in which to acquire such a single averaged-out value is not accurate, and often does not accurately or consistently reflect the reality of enjoyment of a media or its critical consensus. For example, a media with a very high single, averaged-out value from these platforms may make many audience members believe a particular media is good; therefore, they are disappointed when after they watch the film, they did not like it or feel that it did not live up to that value. Therefore, the methodology to obtain a single, averaged-out value utilized by these current platforms in the prior art does not guarantee user/consumer/audience member satisfaction when people watch a media that was assigned a high averaged-out rating number. This occurs because it is difficult to narrow down or predict the wide, varying range of audience's taste.

Financial Incentives for an Accurate Rating System

The objective of having a more accurate rating system is not only a matter of wanting to improve the audience's chance of satisfaction. Guiding audiences to the right media has significant industry-wise implications. For instance, on Dec. 18, 2015, the media "Star Wars: The Force Awakens" was released and raised a staggering $937 million from the US Box Office alone, and received a 92% freshness rating by the "Tomatometer" (from RottenTomatoes.com) and an 89% rating by Audience Score. However, the real chance of an audience member enjoying the film as much as those single, averaged-out ratings suggest is highly uncertain. While Star Wars was roaring at 4,134 screens nationwide, a media entitled "Son of Saul" was released on the same day, at only 3 screens. The movie received a 96% freshness by the Tomatometer, and an 81% by Audience Score, but its total US Box Office earnings were a mere $1.8 million, roughly 0.2% of that of Star Wars. Assuming for a hypothetical scenario that 3% of the total audience members who saw Star Wars did not actually enjoy it and a third of the 3% would have felt that they would have spent their time and money more meaningfully by watching "Son of Saul". If such 1% of Star Wars audience members had been guided toward 'Son of Saul" properly by a more reliable recommendation source, "Son of Saul" would have received additional revenue of 5 times more or $9.37 million at theaters. If "Son of Saul" had collected $11.17 million from the US Box Office, it would have done much better in post-theatrical release formats such as Home Video, DVD, VOD, Television, Cable TV and so forth, which would have compensated the years of efforts expended by all the filmmakers of the movie significantly more than the relatively meager $1.8 million Box Office haul. Therefore, such affluent compensation functions as a strong boost or incentive for filmmakers to take their next journey toward another great film, which would normally take several years. Meanwhile, Star Wars' 1% reduction of its theatrical revenue would not even be noticeable. The studios who made it would simply recall it had collected around $930 million anyway.

Diversity is also a critical parameter for the health of an industry and the current motion picture industry is falling from catching up with the diverse tastes of audiences. Major studios have now focused their movie pipeline to produce content or films involving comic books or Super Heroes of various kinds and ironically, the diversity of Super Hero or comic book films are choking the diversity of the industry. However, proper recommendations could also lure audiences who do not usually find Blockbuster movies interesting to a well-made intelligent Blockbuster. A worthy goal therefore is to match the right movies to the right audience members. The industry would become healthier with a proper recommendation rating/scoring system that is customized to each individual rather than a blunt, single averaged-out number that is increasingly more and more irrelevant to the tastes of audiences. A trust-worthy recommendation system is also particularly necessary in the motion picture industry since movie theaters never refund the tickets when customers are not satisfied with their products or what they paid for, unlike other physical goods that you can return after purchase if you did not find them satisfactory.

Accurate Media Recommendation System

Therefore, the present disclosure describes a system and method to calculate a more accurate value representing aggregate evaluation of a media ("collective score") based on accurate individual ratings ("score") that may be provided by a more precise rating system ("scoring system").

The key of a trust-worthy recommendation system that would solve the aforementioned problem lies in "customization": generating a meaningful score for each customer of the system in lieu of an averaged-out number. Such customization can be achieved by connecting the most powerful and delicate thinking and feeling machines in the universe, the human mind, in the right way.

Another important aspect of the media recommendation system is the social networking aspect, or how users can be clustered based on similar preferences.

The Scoring Site or App Connected to the Scoring Site

First, data may be accumulated through a website that reflects individual audience member's preference for media ("scoring site") and/or a mobile software application installed on a smartphone that is connected to the scoring site. When a person watch a movie, he or she initiates this application on smartphone that brings up the scoring site and inputs two things: (i) which movie the person watched, one of possibly 3 ratings (although the number of ratings is not limited to 3 and is simply provided as 3 as an illustration): 'Bad', 'So-so', and 'Good'. These ratings can also be expressed numerically, with letter grades, emojis, graphics (thumbs up, thumbs down, neutral thumb or open palm), or in any way that may be fun and engaging to audience members; the rating system may also change over time, or be reflected in a certain style for promotions during holidays or the release of particular movies. The person may also leave remarks on the scoring site as to why he or she liked or disliked a certain movie. The scale of the rating used on the scoring site should not be as broad such as 5 stars, 10 points, or 100%, which are the scales of current rating websites or current scoring platforms. This is because general audience members do not share the same distinction for each rating scale and a given audience member will not apply a consistent rating principal every time he or she gives a rating. What is the difference between 3 stars and 3.5 stars or 6 points and 7 points or a 73% rating and a 81% rating? Thus, simple and universal ratings are critical in connecting people in the right way.

Comparison of Scores/Preferences & Networking in the System

Second, such data accumulated in the scoring site for each person becomes a distinctive fingerprint of preference. Then, the scoring site compares each person with every other person in the database using two parameters or factors: (1) how many and/or what media they watched in common ("Mc: media-in-common"), and (2) out of the common media they watched, how many of the same ratings they gave per media ("Rc: ratings-in-common"). Based on the factors "Mc" and "Rc", the system of the present disclosure can then calculate how closely correlated two certain audience members are in terms of their preference of media. The scoring site connects those people who have a very high correlation to each other just like how a social networking site connects people, and users of the scoring site can also read each other's list of media they watched, their ratings of them, and remarks on media. Reading each other's remarks, users can also give an 'Agreement' to the remarks that he or she sympathizes with. Then the scoring site gives additional weight on such 'Agreements' and constantly calculates new connections as new data comes in to build a cluster of closely correlated people that forms a galaxy-like cluster of like-minded media fans that also like similar media or related content.

When a new media is released, a user can check on the scoring site if anyone in their cluster has watched it. If people in a user's cluster have watched it, the scoring site shows the ratings of that user's cluster, not the average rating of the entire audience of the media or all the people who have seen the media. Now, the collective score received from a user's cluster is a much more accurate score that will more likely predict whether a given user will enjoy the media, because it is a trust-worthy recommendation from people you trust in terms of taste. The collective score is also filtered and based on layers of individual scores from other users in a given user's cluster, therefore the collective score is more reliable and robust. Furthermore, the more people that join the scoring site, the more highly correlated people will fill your galaxy-like cluster, and the more accurate the recommendation or collective score will be as a result.

Figure 4:
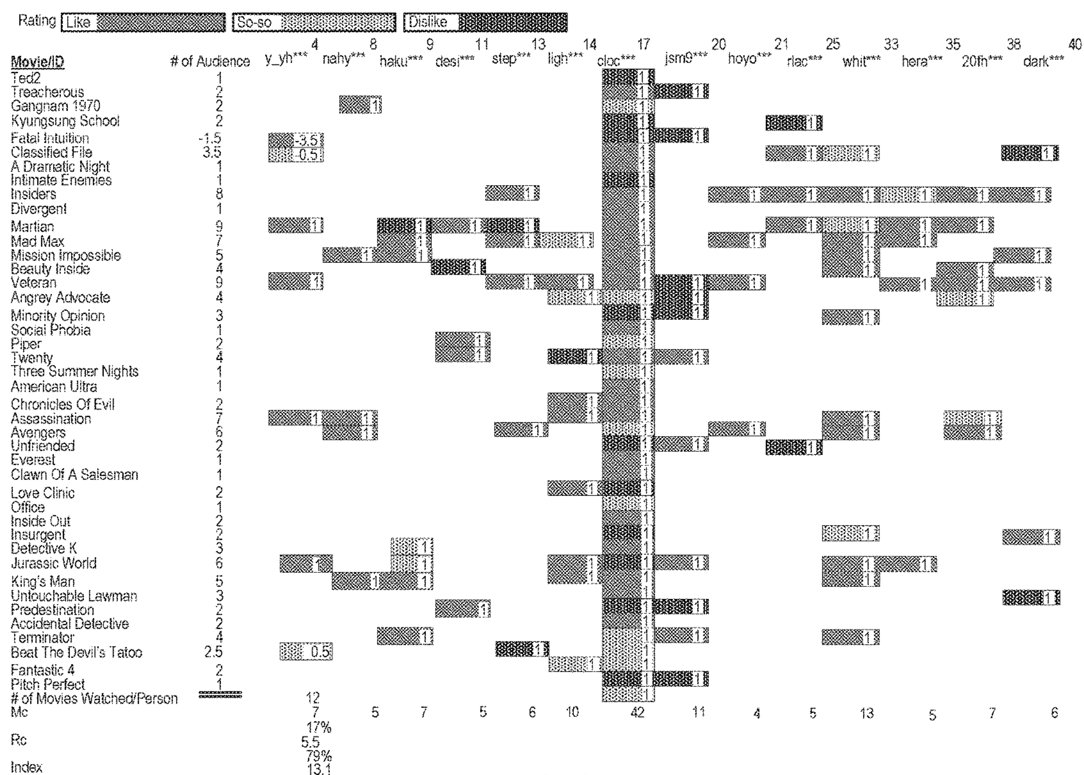
FIG. 4 shows a table of various statistical data compiled from the system and method for recommending media, according to aspects of the disclosure.

FIG. 4 shows statistical data of collective scores and individual scores accumulated via the scoring site, as disclosed by the present disclosure. The data is also accumulated using the aforementioned Mc (media or movie in common) and Rc (ratings in common) factors. The Mc and Rc factors are also used to compile a collective score from a galaxy-like cluster of like-minded users, therefore the accuracy of a collective score for a given media is very high. Satisfaction of users in terms of how accurate a collective score was has also been measured as higher than the satisfaction/accuracy from the values provided by platforms in the prior art.

As an illustrative example, the Mc (media in common) and Rc (ratings in common) factors for three people, two of which saw the same media (Media A), but gave ratings of (1) "Like," (2) "Like," and (3) "So-so, would be, for each person (in the format Mc-Rc: (1) 1-1, (2) 1-1, (3) 0-0. Therefore, it would appear that the ratings in common factor depends from the media in common factor.

Alternative Media Recommendation System

According to an aspect of the present disclosure, a system is provided to connect people who have similar tastes in media based on two levers or parameters. The first lever or parameter is which media a person has consumed and the second lever or parameter is how a person liked the media that they consumed. Out of so many media available, the history of selection reveals what kind of media one is attracted to. Therefore, the first lever is meaningful. Then, using the second lever, how one liked or disliked the media is a direct reflection of one's taste.

Currently, there are many entities (e.g. social networks, websites, apps) that connect media such as movies or TV series using people's expression of their preferences. For example, if someone likes movie A, the entities recommend you movie B that many people who liked movie A also liked. However, the presently disclosed system does the exact opposite. According to an aspect of the present disclosure, the disclosed system connects people using their tastes of media such as movies or TV series.

Also many entities associate a single number to an article of media (e.g. a movie, a TV show, a book) as a rating that is merely the average of individual ratings from a number of people. However, human tastes vary so widely that such a single number is hardly a reliable indication of whether or not someone would like or dislike a particular article of media. It is likely a first person would trust a recommendation far more from another second person who shares similar tastes or understands the first person's taste.

The following stages demonstrate how the presently disclosed system works. Movies or films are used as an example.

Stage 1

People come to the present system and punch in the following: (1) "Which movie they watched" and (2) "How they liked it."

For (2) "How they liked it," a rating can be provided by a person or user. For example, the rating can be on a scale of three, but is not limited to this implantation and can be a variety of different rating systems (e.g. grade A through F, percentage, a numerical score, a count e.g. number of stars, etc.). Taking the three-point scale as an example, the rating can be, for example, a selection out of the following three choices: 'Like', 'So-so', and 'Dislike'. Many other entities let people rate in a 0 to 10 scale or 0% to 100% scale, so the rating scale of the present system will be tailored in order to more accurately reflect the tastes of a user. One of the objectives of a three-point scale is to provide a delicate rating mechanism that maintains some level of data consistency. However, any rating scale can be used that achieves the similar purpose of sensitivity to taste and data consistency. Based on research integrated into the implantation of the present system, the key to coming up with such a rating scale with such purpose(s) is to have users provide a rating in a very simple and straightforward way.

Figure 5A:
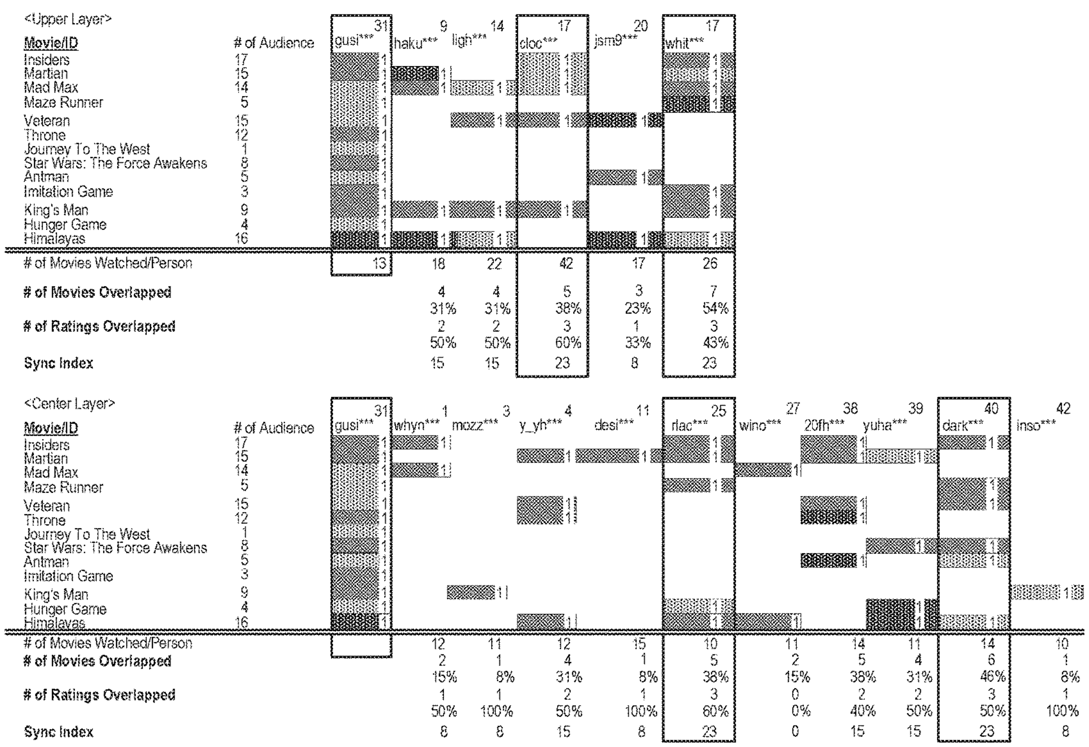
FIG. 5 shows another table of various statistical data compiled from the system and method for recommending media, according to aspects of the disclosure.
Figure 5B:
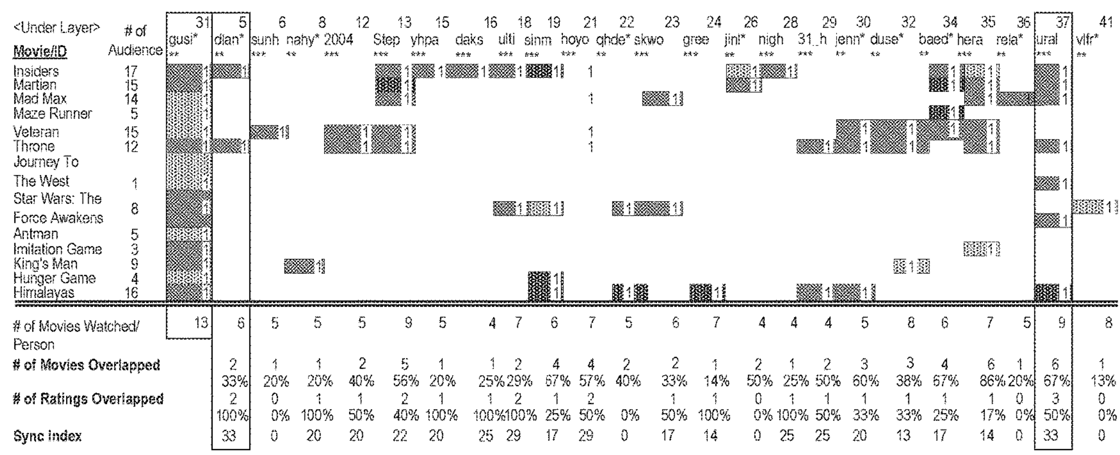

The sample provided, which will be discussed in further detail below and which has data tabulated in FIG. 5, covers 43 people who watched 139 different movies.

Stage 2

The 31st person out of the total of 43 people has an ID named "gusi***" (herein "gusi"). "Gusi" is selected here and discussed to provide an example that shows how the present system would work.

For example, "gusi" watched 13 movies out of 139 movies. The present system first cuts out movies that "gusi" didn't watch. Then, the present system cuts out any one who watched zero movies (or no movies) from the list of 13 movies that "gusi" watched. In other words, for all the users, a group of users is aggregated who watched at least one of the same media. Besides "gusi," 38 people are left and they are to be analyzed to see who has or shares similar tastes with "gusi."

Stage 3

The present system then divides the remaining 38 people into three groups according to how many movies each of them watched. Since "gusi" has watched 13 movies, people who watched 10 to 16 movies (plus or minus 25% of 13) are grouped as those who watched a similar number of movies as "gusi." This group is placed at a center layer.

People who watched less than 10 movies are grouped and placed at an under layer. People who watched more than 16 movies are grouped and placed at an upper layer.

The reason why these people are grouped and positioned in such a hierarchical way is based on the idea that avid moviegoers would be better recommenders than someone who seldom goes to the movies, e.g. once a year on Thanksgiving.

Stage 4

Within each group, the present system first compares how many common movies "gusi" and each person in that group watched (the media-in-common factor described above). Second, the present system then compares how many common ratings "gusi" and each person in that group gave for the common movies (the ratings-in-common factor described above). The more movies the two of them ("gusi" and each person in a group) watch together (matching media-in-common factor) and the more the ratings of the two of them are the same (matching ratings-in-common factor), the present system can conclude that the two of them share more of a similar taste.

Figure 6:
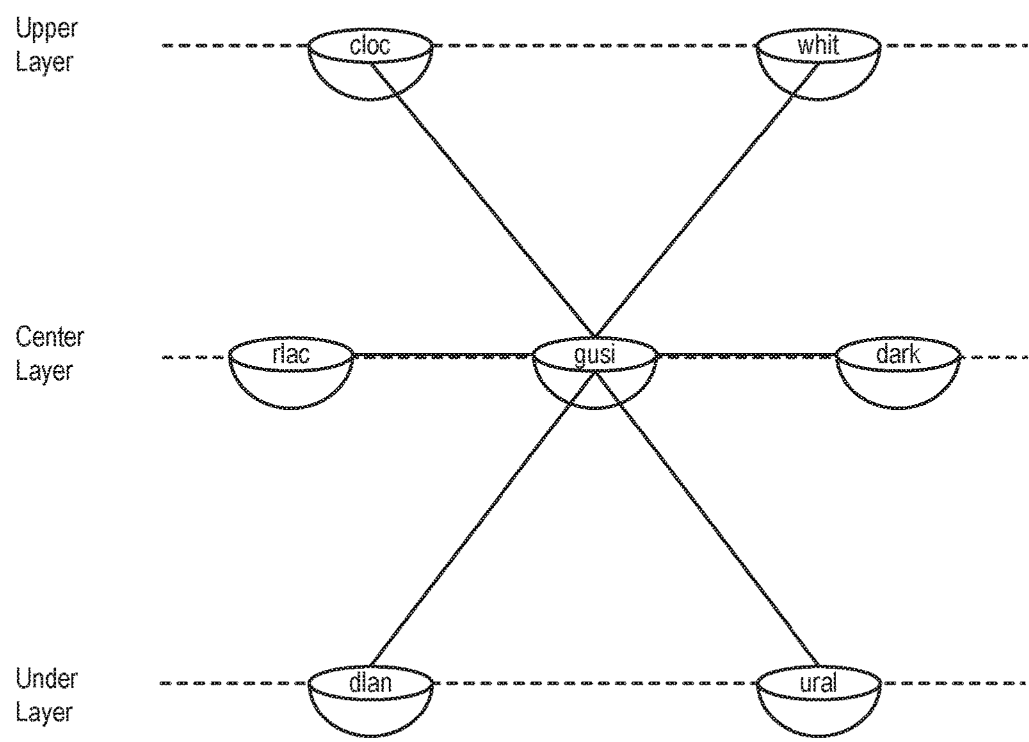
FIG. 6 shows users grouped according to their preferences, according to aspects of the disclosure.

FIG. 6 shows a diagram with user "gusi" at the center. Consequently, in the upper layer group, users "cloc*" (herein "cloc") and "whit*" (herein "whit") are proved to have the closest taste with "gusi." In the center layer group, users "rlac*" (herein "rlac") and "dark*" (herein "dark") have the closest taste with "gusi," and in the under layer group, users "dlan*" (herein "dlan") and "ural*" (herein "ural") are discovered as having the closest taste to "gusi."

Stage 5

Now, "gusi" can click each of 6 persons and compare their list of watched movies and rating for each movie. "Gusi" and each of the 6 users or people can converse about their liking or disliking of commonly watched movies and hence, understand more about the subtle tastes of one another. Then, any of them can recommend certain movies that anyone of them watched and liked. Such a recommended movie is highly likely to be liked and recommended because of the similar tastes of the layer.

The very same process shall be applied to every single person who typed in the movies that he or she watched and the ratings of the movies.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A method for recommending media, comprising:

receiving a media watched and a rating of it from at least one user;

aggregating a group of users who watched at least one of the same media;

splitting the group of users into multiple layers based on the amount of media an individual user from the group of users has watched, wherein the amount of media comprises a number of movies and the multiple layers comprise:

an upper layer including users from the group of users who have watched more than a first metric based on the number of movies, a center layer including users from the group of users who have watched the number of movies, and an under layer including users from the group of users who have watched less than a second metric based on the number of movies and further wherein the first metric is the number of movies added to 25% of the number of movies and the second metric is the number of movies subtracted by 25% of the number of movies; and for each layer, matching users from the group of users with similar taste based on a media-in-common factor and a ratings-in-common factor.

2. The method of claim 1, wherein the rating comprises a three-point scale, a grade, a percentage, a number, or a scale designed to optimize taste sensitivity and data consistency.

3. The method of claim 1, wherein the media-in-common factor is how many media the plurality of users watched in common.

4. The method of claim 3, wherein the ratings-in-common factor is how many of the plurality of users gave the same ratings for each of the commonly watched media for the media-in-common factor.

5. The method of claim 1, further comprising for each layer, calculating a collective score for a new media based on a collective scoring system.

6. The method of claim 5, wherein the collective scoring system is an average of the ratings given to the new media by all users in the layer.

7. The method of claim 1, further comprising allowing the users in a layer to recommend media to one another based on messages, interaction or a list of media watched and ratings by others in the layer, the recommended media having a higher probability of being liked due to similar tastes shared by the layer.

* * * * *